(12) United States Patent
Ohmori et al.

(10) Patent No.: US 7,110,852 B2
(45) Date of Patent: Sep. 19, 2006

(54) DIE MACHINING METHOD AND DEVICE BY V-CAD DATA

(75) Inventors: Hitoshi Ohmori, Wako (JP); Masahiro Anzai, Wako (JP); Kiwamu Kase, Wako (JP); Hideo Tashiro, Wako (JP); Akitake Makinouchi, Wako (JP)

(73) Assignee: Riken, Saitama (JP)

( * ) Notice: Subject to any disclaimer, the term of this patent is extended or adjusted under 35 U.S.C. 154(b) by 0 days.

(21) Appl. No.: 10/486,659

(22) PCT Filed: Aug. 14, 2002

(86) PCT No.: PCT/JP02/08267
§ 371 (c)(1),
(2), (4) Date: Aug. 17, 2004

(87) PCT Pub. No.: WO03/017016

PCT Pub. Date: Feb. 27, 2003

(65) Prior Publication Data
US 2004/0267400 A1      Dec. 30, 2004

(30) Foreign Application Priority Data
Aug. 16, 2001   (JP) .................. 2001-246949

(51) Int. Cl.
*G06F 19/00*   (2006.01)
(52) U.S. Cl. .................. 700/182; 700/118
(58) Field of Classification Search .......... 700/95–98, 700/117–121, 182, 186–194, 197
See application file for complete search history.

(56) References Cited

U.S. PATENT DOCUMENTS 4,694,404 A * 9/1987 Meagher .................. 345/421
5,197,013 A * 3/1993 Dundorf .................. 700/182
5,517,602 A  5/1996 Natarajan (Continued)

FOREIGN PATENT DOCUMENTS

EP        0938949 A1    9/1999

(Continued)

OTHER PUBLICATIONS

Tang Zesheng, "Octree Representation and its Applications in CAD," Journal of Comput. Sci & Tech., vol. 7, No. 1 (1992), pp. 29-38.*

(Continued)

*Primary Examiner*—Maria N. Von Buhr
(74) *Attorney, Agent, or Firm*—Griffin & Szipl, P.C.

(57) ABSTRACT

There is prepared V-CAD data obtained by dividing external data 12 consisting of boundary data of an object into rectangular parallelepiped cells 13 having boundary planes orthogonal to each other in accordance with octree division and separating the respective divided cells into internal cells 13*a* positioned on the inner side of the object and boundary cells 13*b* including a boundary face, and mold data and mold processing data used to manufacture the object are generated from data of a reference plane which at least partially comes into contact with the object 1 and the V-CAD data. Further, in the mold processing data, a plurality of the processing tools 2 are selected in descending order of a size in accordance with sizes of the internal cells 13*a* of a processing portion, and the processing tool 2 is moved in a plane of the mold and in the thickness direction, thereby processing the mold. As a result, by using the V-CAD data, the NC processing program for mold processing can be simplified, and the mold processing time can be greatly reduced.

12 Claims, 5 Drawing Sheets

U.S. PATENT DOCUMENTS

| | | | | |
|---|---|---|---|---|
| 6,075,538 | A | * | 6/2000 | Shu et al. .................... 345/419 |
| 6,214,279 | B1 | * | 4/2001 | Yang et al. .................. 264/482 |
| 6,471,800 | B1 | * | 10/2002 | Jang et al. .................... 156/58 |
| 6,606,528 | B1 | * | 8/2003 | Hagmeier et al. ............ 700/98 |
| 6,627,835 | B1 | * | 9/2003 | Chung et al. ............ 219/69.12 |
| 6,643,560 | B1 | * | 11/2003 | Shimomura ................. 700/160 |

FOREIGN PATENT DOCUMENTS

| | | | |
|---|---|---|---|
| EP | 1229463 A2 | * | 8/2002 |
| JP | 04-075850 | | 3/1992 |
| JP | 06-315849 | | 11/1994 |
| JP | 2000-340476 | | 12/2000 |

OTHER PUBLICATIONS

Ajay Kela, "Hierarchical Octree Approximations for Boundary Representation-Based Geometric Models," Computer-Aided Design, Jul./Aug. 1989, pp. 355-362.*

Yamaguchi et al., "Computer-Integrated Manufacturing of Surfaces Using Octree Encoding," IEEE Comp. Graphics & Appliations, vol. 1, No. 1, Jan. 1981, pp. 60-62.*

International Search Report, completed Nov. 6, 2002, at the Japanese Patent Office, mailed Nov. 19, 2002.

Gary Shute, Overview of C Programming. Aug. 1999, pp. 1-7. http://www.d.umn.edu/-gshute/C/overview.html.

W.E. Lorensen et al., Marching Cubes: A High Resolution 3D Surface Construction Algorithm, Computer Graphics, vol. 21, 1987, pp. 163-169.

R.S. Avila et al., A Haptic Interaction Method for Volume Visualization. Proceedings of the Visualization Conference, IEEE, XP-000704188, 1995, pp. 197-204.

U. Roy et al., Computation of a Geometric Model of a Machined Part from its NC Machining Programs, Computer-Aided Design, vol. 31, 1999, pp. 401-411.

* cited by examiner

Fig.1A
PRIOR ART
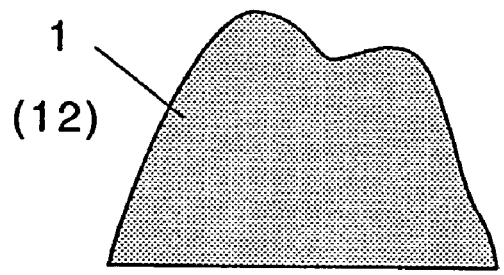
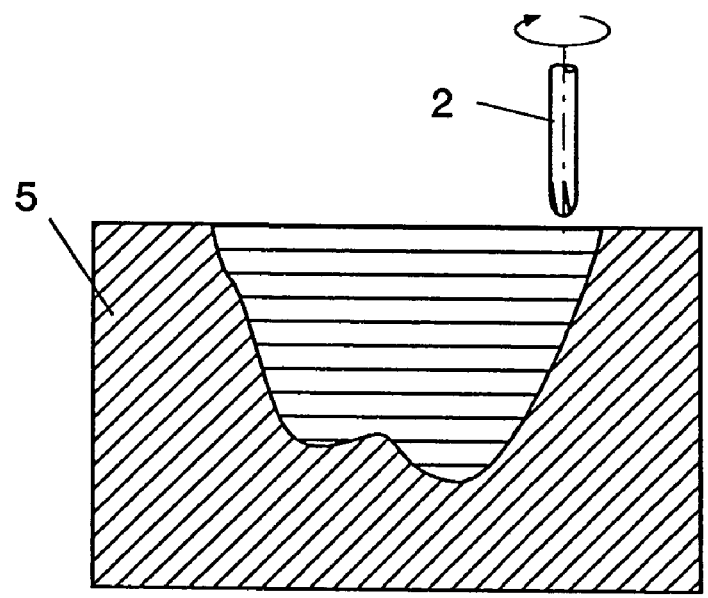
Fig.1B
PRIOR ART
Fig.1C
PRIOR ART
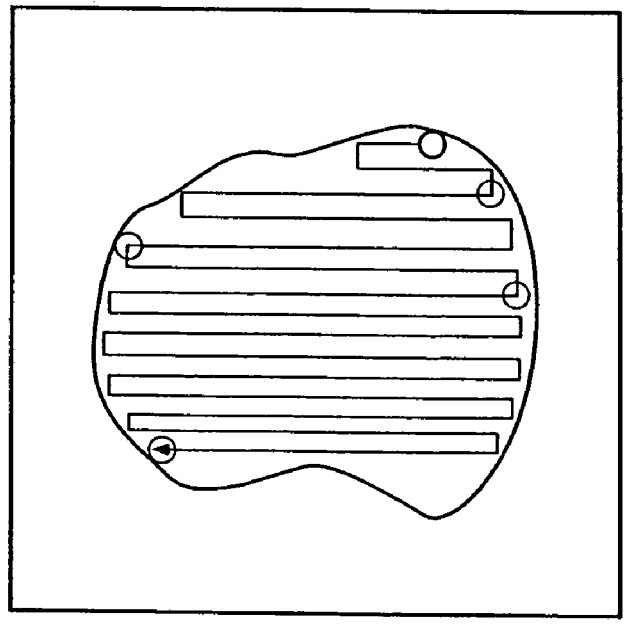

DIE MACHINING METHOD AND DEVICE BY V-CAD DATA

This is a National Phase Application in the United States of International Patent Application No. PCT/JP/02/08267 filed Aug. 14, 2002, which claims priority on Japanese Patent Application No. 246949/2001, filed Aug. 16, 2001. The entire disclosures of the above patent applications are hereby incorporated by reference.

BACKGROUND OF THE INVENTION

1. Technical Field

The present invention relates to a method and an apparatus for mold processing using V-CAD data, which can store entity data combining a shape and a physical property by small memory capacity.

2. Background Art

Many mechanical parts are molded by using molds, and a mold is indispensable for inexpensively manufacturing high-quality mechanical parts in high volume. That is, the mold is extensively used for press molding, casting, injection molding and others.

However, it has been considered that manufacture of the mold requires a long period of time and cost. That is, the mold is manufactured in the order of design, mold processing, assembling/finishing, trying/modification and others, and an NC processing program for the mold processing and the mold processing require most of the time.

As shown in a type drawing of FIG. 1A, when CAD data of a final product 1 is obtained by the mold design, the NC processing program of an NC control apparatus is produced from this data, thereby performing the mold processing.

As shown in FIG. 1B, a large part of the processing of a mold 5 is milling using an end mill 2, and light cutting using a small-diameter tool is the main in the mold processing in which many complicated shapes are processed. Therefore, a trajectory of the small-diameter tool for the processing has a small pitch corresponding to a processing width as shown in FIG. 1C, and the processing accuracy of the mold is determined by this trajectory. Thus, the NC processing program becomes complicated and extravagant, and the processing time also becomes long because of the small processing width.

Further, in order to solve this drawback, when large and small tools are replaced to perform processing, the NC processing program must be produced in accordance with each tool, and the program production becomes further complicated.

SUMMARY OF THE INVENTION

The inventors of the present invention and others invented and filed a "method of storing entity data" by which entity data combining a shape and a physical property with a small storage capacity (Japanese Patent Application No. 2001-025023, not laid-open).

This method of storing entity data divides external data consisting of boundary data of an object into rectangular parallelepiped internal cells having boundary planes orthogonal to each other and boundary cells in accordance with octree (oct-tree) division, and stores various physical properties in accordance with the respective cells. By this method, a shape, a structure, physical information and history of an object can be managed in an integrated fashion, data concerning a series of processes such as design, processing, assembling, test, evaluation and others can be managed with the same data, and CAD and simulation can be integrated. It is to be noted that the entity data combining the shape and the physical property is referred to as "V-CAD data".

The present invention has been contrived in order to solve the above-described problems by using this method. That is, it is an object of the present invention to provide a method and an apparatus for mold processing using V-CAD data, which can simplify an NC processing program for mold processing and greatly reduce a mold processing time by using the V-CAD data.

According to the present invention, there is provided a mold processing method for using a processing tool in accordance with V-CAD data, which comprises the steps of: preparing V-CAD data obtained by dividing external data (12) consisting of boundary data of an object (1) into rectangular parallelepiped cells (13) having boundary planes orthogonal to each other in accordance with octree division and separating the respective divided cells into internal cells (13a) positioned on the inner side of the object, or on the outer side of the object, and boundary cells (13b) including a boundary face; and generating mold data and mold processing data used for manufacturing of the object, from data of a reference plane which at least partially comes into contact with the object (1) and from the V-CAD data.

According to a preferred embodiment of the present invention, in the mold processing data, a plurality of processing tools (2) are selected in descending order of a size in accordance with the sizes of the internal cells (13a) of a processing portion, and the processing tool is moved in the plane of the mold and along the thickness direction, thereby processing the mold. Further, the processing tool (2) having the size that its motion trajectory does not protrude from the boundary plane of a target internal cell (13a) is selected. Furthermore, the processing tool (2) is selected from a drilling tool, a milling tool, a cutting tool, a polishing tool, and an electric discharge machining tool. Moreover, the cutting tool is a metal bonded grinding stone, and it is preferable to apply the electrolytic dressing.

In addition, according to the present invention, there is provided a mold processing apparatus using V-CAD data comprising: a storage device (4) which stores V-CAD data obtained by dividing external data (12) consisting of boundary data of an object (1) into rectangular parallelepiped cells (13) having boundary planes orthogonal to each other in accordance with octree division and separating the respective divided cells into internal cells (13a) positioned on the inner side of the object or on the outer side of the object, and boundary cells (13b) including a boundary face; a data generation program (6) which generates mold data and mold processing data used for manufacturing of the object, from data of a reference plane which at least partially comes into contact with the object (1) and from the V-CAD; and an NC control device (8) which selects a plurality of processing tools (2) in descending order of a size in accordance with sizes of the internal cells (13a) of a processing portion of the mold processing data and moves the processing tool in the plane of the mold and along the thickness direction, thereby processing the mold.

According to the method and apparatus of the present invention mentioned above, since the V-CAD data is stored, which is obtained by dividing the external data (12) of the object (1) into rectangular parallelepiped cells (13) having boundary planes orthogonal to each other in accordance with octree division and separating the respective divided cells into the internal cells (13a) positioned on the inner side or the outer side of the object and the boundary cells (13b)

including the boundary face, the external data (12) can be stored by using a small storage capacity as a hierarchy of the cells.

Additionally, based on this V-CAD data, the mold data and the mold processing data used to manufacture the object are generated from the data of a reference plane which is at least partially comes into contact with the object (1) and from the V-CAD data, a plurality of the processing tools (2) are selected in descending order of a size in accordance with sizes of the internal cells (13a) of the processing portion, and the processing tool is moved in the plane of the mold and along the thickness direction, thereby processing the mold. Therefore, the NC processing program for mold processing can be simplified and the mold processing time can be substantially greatly reduced by eliminating and processing the internal cells by using the relatively large processing tool (2) and then processing the boundary cells (13b) by the small processing tool.

Other objects and advantageous features of the present invention will be apparent from the following description in conjunction with the accompanying drawings.

BRIEF DESCRIPTION OF DRAWINGS

FIG. 1A, FIG. 1B and FIG. 1C are type drawings of conventional mold processing means;

BEST MODE FOR CARRYING OUT OF THE INVENTION

A preferred embodiment according to the present invention will now be described hereinafter with reference to the accompanying drawings.

Figure 2:
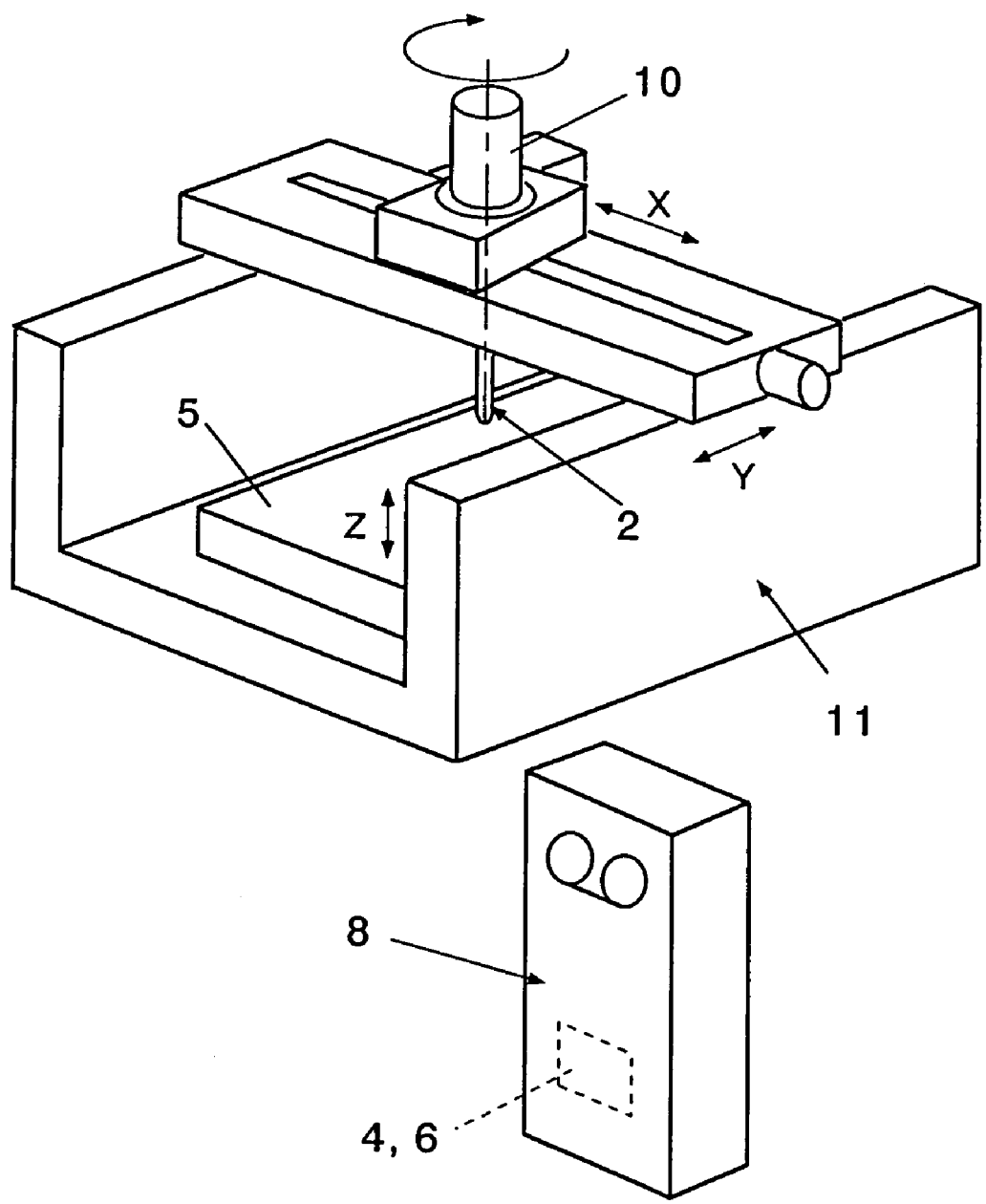
FIG. 2 is an overall structural view of a mold processing apparatus according to the present invention.

FIG. 2 is an overall structural view of a mold processing apparatus according to the present invention. As shown in the drawing, the mold processing apparatus according to the present invention includes: a storage device 4 which stores V-CAD data; a data generation program 6 which generates mold data and mold processing data; and an NC control device 8 which processes a mold 5 by using the mold processing data.

Further, in this example, this mold processing apparatus includes: a processing tool 2 (for example, a ball end mill) which is a tool to process the mold 5; a high-speed motor 10 which rotates the processing tool 2 at a high speed; and a triaxial drive device 11 which moves the processing tool 2 in the directions X, Y and Z. The triaxial drive device 11 is numerically controlled by the NC control device 8.

It is preferable that the processing tool 2 can be arbitrarily selected and replaced from a plurality of processing tools with different sizes by a non-illustrated automatic replacement device.

It is to be noted that the processing tool 2 (tool) is not restricted to a ball end mill, and it may be any of a drilling tool, a milling tool, a cutting tool, a polishing tool, an electric discharge machining tool and others. The cutting tool is a metal bonded grinding stone and it is preferable to apply the electrolytic dressing thereto. Furthermore, the cutting tool and the electric discharge machining tool are not restricted to rotary tools, and a non-rotary tool may be used. In this case, as to the cutting too, applying supersonic vibrations to a rectangular tool equivalent to the cell can suffice. Also, in regard to the electric discharge tool, a rectangular electrode equivalent to the cell can be used.

Figure 4:
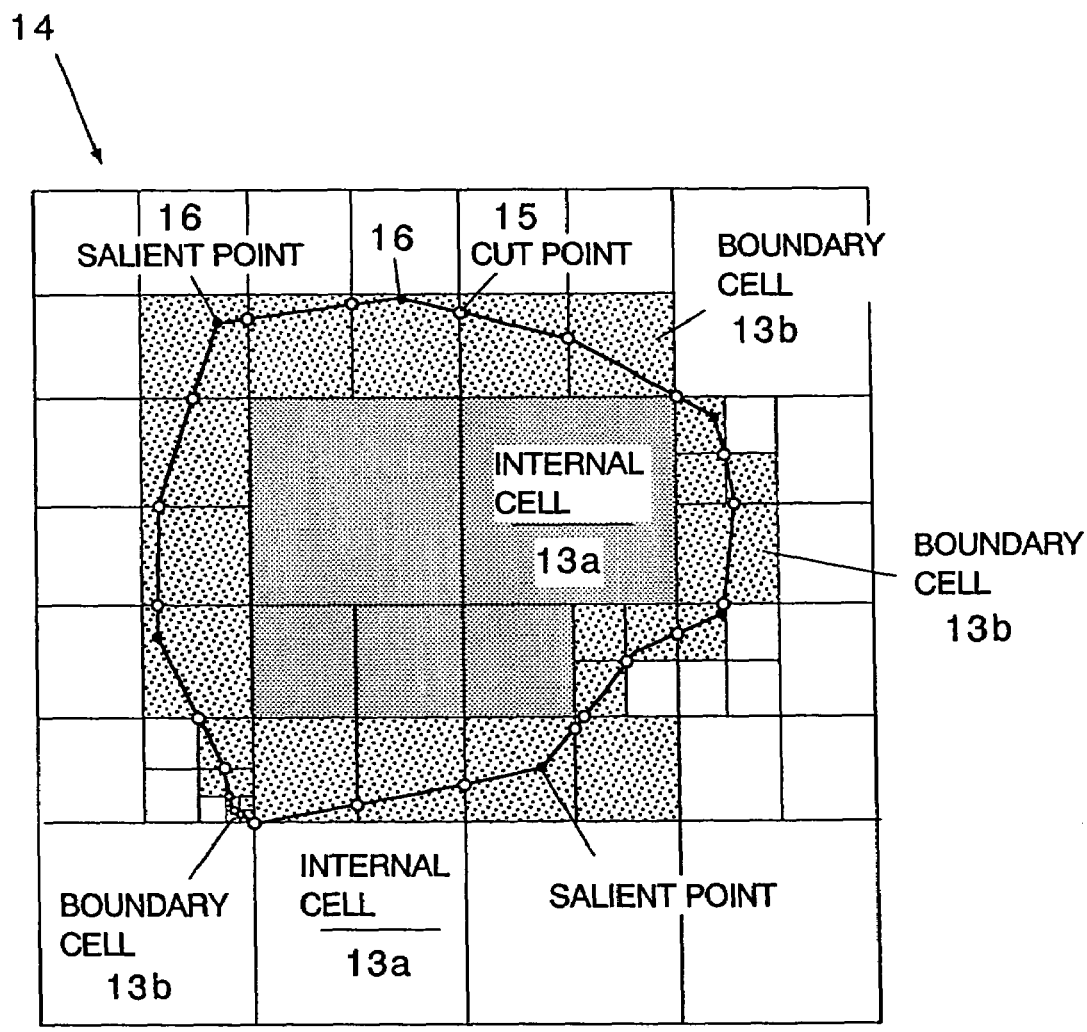
FIG. 4 is a type drawing two-dimensionally showing a division method according to the present invention.

The storage device 4 stores the V-CAD data. This V-CAD data is obtained by dividing external data 12 consisting of boundary data of an object 1 into rectangular parallelepiped cells 13 having boundary planes orthogonal to each other in accordance with octree division and separating the respective divided cells into internal cells 13a positioned on the inner side of the object or on the outer side of the object, as shown in FIG. 4, and boundary cells 13b including a boundary face.

Figure 3:
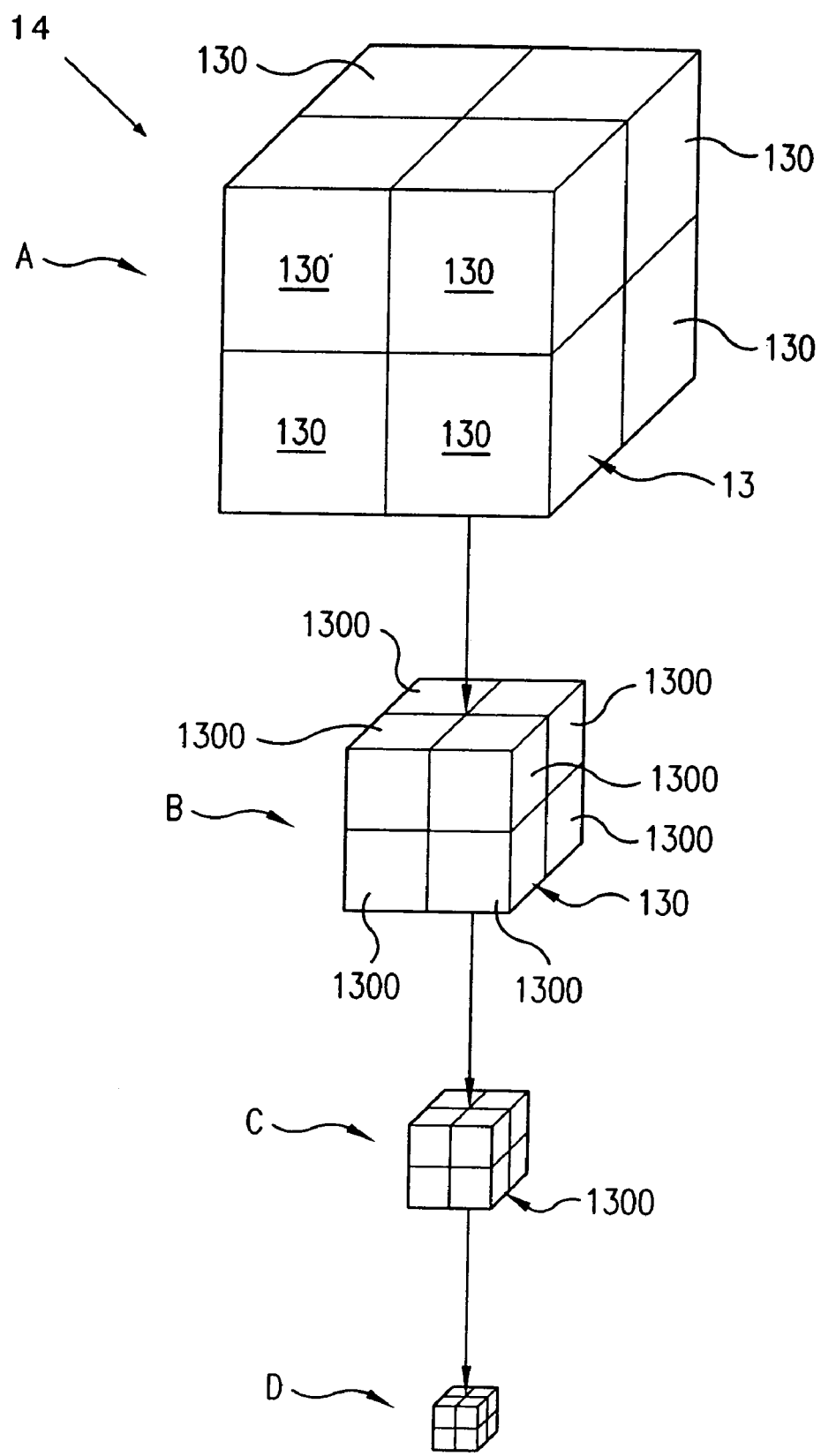
FIG. 3 is an explanatory view of a data structure in the mold processing method according to the present invention.

FIG. 3 is an explanatory view of a data structure in the mold processing method according to the present invention. In the V-CAD data, the modified octree space division is performed. The octree expression, namely, the space division based on octree divides a rectangular solid 13 as a reference which includes a target solid (object) into eight (A) and recursively repeats the eight-part division processing until the solid is completely included in or excluded from each area as shown in (B), (C) and (D). By this octree division, a quantity of data can be greatly reduced as compared with the voxel expression.

One space area divided by the space division based on octree is referred to as a cell 13. The cell is a rectangular parallelepiped having boundary planes orthogonal to each other. The areas occupying in the space are represented by a hierarchical structure based on the cells, the division number or a resolution. As a result, the object in the entire space is represented as superimposition of the cells 130, 1300 having the different sizes.

That is, at the octree division step (B), the boundary and the inside physical property are converted into the following entity data 14 (V-CAD data) from the external data 12. The boundary data approximates exactly (for example, in case of a flat plane, it can be exactly reconfigured at three points included therein) or in a specified limit deviation tolerance (a position, a tangent line, a normal line and a curvature, and threshold values specified for the connectivity of them).

A special case of an interpolation curve is a Marching Cube. In the present invention, subdivision is necessarily performed until expression at cut points on an edge line is possible and until the normal line or a main curvature and the continuity are satisfied. Furthermore, the surface of the second (quadratic) or lower order is exactly expressed, and a free-form surface is approximated by the surface in the cell based on the flat surface or the surface of the second order, thereby saving only a geometric inherent quantity.

FIG. 4 is a type drawing two-dimensionally showing the division method according to the present invention. In the present invention, the respective divided cells 13 are separated into internal cells 13a positioned on the inner side or on the outer side of the object and boundary cells 13b including a boundary face.

That is, in the present invention, the modified octree is used in order to express the boundary cell 13b, cells which are completely included inside are constituted by the internal cells 13a (rectangular parallelepiped) having the maximum size, and cells including boundary information from the external data 12 are constituted as the boundary cells 13b. Each boundary cell 13b is exactly or approximately replaced with cut points 15 (indicated by while circle in the drawing) on 12 edge lines in the three-dimensional expression or four edge lines in the two-dimensional expression.

The boundary cell 13b is subjected to octree division until the sufficient cut points 15 can be obtained, with which boundary shape elements constituting the boundaries included in the external data 12 can be reconfigured (exactly with respect to analytic surfaces such as a flat surface or a quadric surface, and approximately with respect to boundary shape elements which can be expressed by a free-form surface or a discrete point group).

For example, the space is hierarchically divided into eight parts until two points on one line segment become cut points 15 on the edge line of the cell in case of one line segment, until three points become the cut points in case of a flat surface, until three points become cut points in case of a quadratic curve, until four points become cut points in case of a quadratic surface, and until necessary and sufficient points and the edge line of the cell can be found in a defined range in cases where the expression of the external data is known with respect to each of a polynomial surface and a rational expression surface.

That is, division is carried out until a position to be subjected to subdivision satisfies a specified resolution at a boundary (surface) part or until a rate of change of a value of an analysis result (a stress, a distortion, a pressure, a flow velocity or the like) does not exceed a specified threshold value.

Further, as to salient points 16 (indicated by black circles in the drawing) of the cell 13b including a plurality of the boundary shape elements, the boundary therein can be indirectly expressed as an intersecting line of the boundary expressed by the cut point 15 held by an adjacent boundary cell (which has the cut points sufficient for reconfiguration and is divided until the boundary elements completely come across), and hence subdivision is not carried out more than needs.

Therefore, the V-CAD data 14 becomes, as information concerning the shapes stored inside the cell, an index indicating a position of the cell, the division number or a resolution indicating a degree of detail in the hierarchy, a pointer indicating an adjacent cell, the number of cut points and/or coordinate values of cut points. Further, depending on use application, the V-CAD data 14 can become a normal line, a curvature or the like.

Furthermore, as the V-CAD, node information or values of result are held in the form of Euler in the lowermost layer. How to determine a threshold value (limit deviation tolerance) concerning the continuity of a position, a normal line, a tangent line, and a curvature at the boundary is defined in such a manner that the minimum resolution in subdivision becomes as large as possible.

In FIG. 2, the data generation program 6 generates the mold data and the mold processing data used for manufacturing of the object, from the data of the reference face which at least partially comes into contact with the object 1 and from the V-CAD data 14.

Moreover, the NC control device 8 selects a plurality of the processing tools 2 in descending order of a size in accordance with the sizes of the internal cells 13a of the processing portion of the mold processing data, and moves the processing tool in the plane of the mold and along the thickness direction, thereby processing the mold.

Figure 5A:
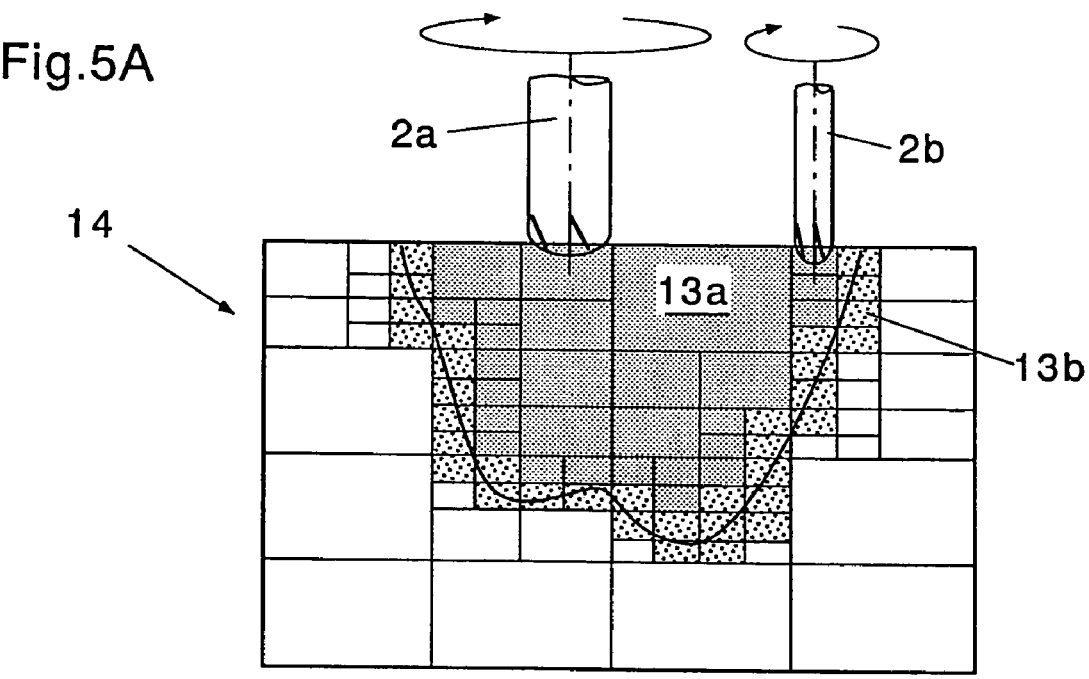
FIGS. 5A and 5B are type drawings of a mold processing method according to the present invention.
Figure 5B:
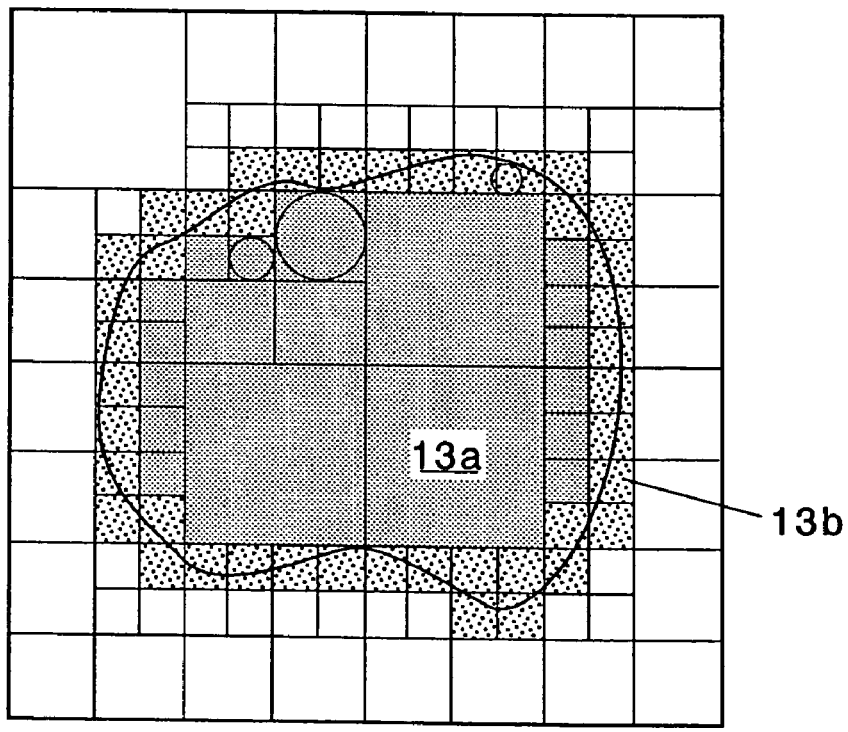

FIGS. 5A and 5B are type drawings showing the mold processing method according to the present invention. In the mold processing method according to the present invention, with above-described mold processing apparatus, the data generation program 6 is first used to generate the mold data and the mold processing data for manufacturing of the object 1, from the data of the reference plane which at least partially comes into contact with the object 1 (see FIG. 1) and from the V-CAD data 14.

FIG. 5A is a side view showing the mold data in the form of V-CAD data, and FIG. 5B is a plane view of the same. As shown in the drawings, the mold data can be separated into the internal cells 13a and the boundary cells 13b.

In the method according to the present invention, a plurality of the processing tools 2 are selected in descending order of a size in accordance with the sizes of the internal cells 13a, and the processing tool 2 is moved in the plane of the mold and along the thickness direction, thereby processing the mold. Moreover, at this moment, as the processing tool 2, one having the motion trajectory which does not protrude from the boundary plane of the internal cell 13a is selected.

Therefore, when processing the large internal cell 13a, the internal cell can be subjected to elimination processing with the simple NC processing program by using the large processing tool 2a in a short time as shown in the drawing. In addition, when processing the relatively small internal cell 13a, the internal cell can be likewise subjected to elimination processing with the simple NC processing program by using the small processing tool 2b in a short time as shown in the drawing. In this manner, the internal cell 13a can be processed and eliminated with the simple program by using the relative large processing tools 2a and 2b.

At last, a desired mold can be finished by processing the boundary cell 13b using the small processing tool.

According to the method and the apparatus of the present invention mentioned above, since the V-CAD is stored, which is obtained by dividing the external data 12 of the object 1 into rectangular parallelepiped cells 13 having boundary planes orthogonal to each other in accordance with the octree division and separating the respective divided cells into the internal cells 13a positioned on the inner side of the object and the boundary cells 13b including the boundary face, the external data 12 can be stored with a small storage capacity as a hierarchy of the cells.

Additionally, based on this V-CAD data, the mold data and the mold processing data used to manufacture the object are generated from the data of the reference plane which at least partially comes into contact with the object 1 and from the V-CAD, a plurality of the processing tools 2 are selected in descending order of a size in accordance with the sizes of the internal cells 13a of the processing portion, and the processing tool is moved in the plane of the mold and along the thickness direction, thereby processing the mold. Therefore, the internal cells are subjected to elimination processing by using the relatively large processing tool, and then the boundary cells 13b are processed by using the small processing tool. As a result, the NC processing program for mold processing can be simplified, and the mold processing time can be greatly reduced.

As described above, the mold processing method and apparatus using the V-CAD data according to the present invention have the excellent advantages such as simplification of the NC processing program for mold processing and great reduction in the mold processing time by using the V-CAD data.

It is to be noted that the present invention has been described with reference to the several preferred embodiments but it can be understood that scope of the claims included in the present invention is not restricted to these embodiments. On the contrary, the scope of the claims of the present invention includes all improvements, modifications and equivalents included in the appended claims.

The invention claimed is:

1. A mold processing method using a processing tool, comprising the steps of:
    preparing V-CAD data obtained by dividing external data consisting of boundary data of an object into rectangular parallelepiped cells having boundary planes orthogonal to each other in accordance with octree division and separating respective divided cells into internal cells positioned on an inner side or on an outer side of the object and boundary cells including a boundary face; and
    generating mold data and mold processing data used for manufacturing of the object, from data of a reference plane which at least partially comes into contact with the object and from the V-CAD data, wherein, in the mold processing data, a plurality of processing tools are selected in descending order of a size in accordance with sizes of the internal cells of a processing portion, and a processing tool from the plurality of processing tools is moved in a plane of a mold and in a thickness direction, thereby processing the mold.

2. The mold processing method according to claim 1, wherein the processing tool is one whose motion trajectory does not protrude from a boundary plane of a target internal cell.

3. The mold processing method according to claim 1, wherein the processing tool is selected from a drilling tool, a milling tool, a cutting tool, a polishing tool and an electric discharge processing tool.

4. The mold processing method according to claim 3, wherein the cutting tool is a metal bonded grinding stone and electrolytic dressing is applied thereto.

5. The mold processing method according to claim 1, further comprising the step of:
    processing the mold using the mold processing data.

6. The mold processing method according to claim 1, wherein boundary cells are subjected to octree division until sufficient cut points are obtained to reconfigure boundary shape elements.

7. The mold processing method according to claim 6, further comprising the step of:
    expressing a salient point, of a boundary cell that includes a plurality of boundary shape elements, as an intersecting line of the boundary expressed by a cut point held by an adjacent boundary cell.

8. A mold processing apparatus using V-CAD data comprising:
    a storage device which stores therein V-CAD data obtained by dividing external data consisting of boundary data of an object into rectangular parallelepiped cells having boundary planes orthogonal to each other in accordance with octree division and separating respective divided cells into internal cells positioned on an inner side or on an outer side of the object and boundary cells including a boundary face;
    a data generation program which generates mold data and mold processing data used for manufacturing of the object, from data of a reference plane which at least partially comes into contact with the object and from the V-CAD data stored by the storage device;
    a plurality of processing tools; and
    a NC control device which selects the plurality of processing tools in descending order of size in accordance with sizes of the internal cells of a processing portion of the mold processing data and moves a processing tool from the plurality of processing tools in a plane of a mold and in a thickness direction, thereby processing the mold.

9. The mold processing method according to claim 1, wherein the plurality of processing tools include a first processing tool and a second processing tool, wherein the first processing tool is larger than the second processing tool and a first portion of the mold corresponding to the internal cells of the processing portion is subjected to elimination processing by the first processing tool and a second portion of the mold corresponding to boundary cells is subjected to elimination processing by the second processing tool.

10. The mold processing apparatus according to claim 8, wherein the plurality of processing tools include a first processing tool and a second processing tool, wherein the first processing tool is larger than the second processing tool, wherein the NC control device selects the first processing tool for elimination processing of a first portion of the mold corresponding to internal cells of the processing portion and the NC control device selects the second processing tool for elimination processing of a second portion of the mold corresponding to boundary cells.

11. The mold processing apparatus according to claim 10, wherein the NC control device includes the storage device and the data generation program.

12. A mold processing method using a processing tool, comprising the steps of:
    (a) preparing V-CAD data obtained by dividing external data consisting of boundary data of an object into rectangular parallelepiped cells having boundary planes orthogonal to each other in accordance with octree division and separating respective divided cells into internal cells positioned on an inner side or on an outer side of the object and boundary cells including a boundary face, wherein boundary cells are subjected to octree division until sufficient cut points are obtained to reconfigure boundary shape elements;
    (b) generating mold data and mold processing data used for manufacturing of the object, from data of a reference plane which at least partially comes into contact with the object and from the V-CAD data, wherein, in the mold processing data, a plurality of processing tools are selected in descending order of size in accordance with sizes of the internal cells of a processing portion, and a processing tool from the plurality of processing tools is moved in a plane of a mold and in a thickness direction, thereby processing the mold; and
    (c) wherein the processing tool is a cutting tool comprising a metal bonded grinding stone and the method includes applying electrolytic dressing to the metal bonded grinding stone.

* * * * *

UNITED STATES PATENT AND TRADEMARK OFFICE
CERTIFICATE OF CORRECTION

| | | |
|---|---|---|
| PATENT NO. | : 7,110,852 B2 | Page 1 of 1 |
| APPLICATION NO. | : 10/486659 | |
| DATED | : September 19, 2006 | |
| INVENTOR(S) | : Hitoshi Ohmori et al. | |

It is certified that error appears in the above-identified patent and that said Letters Patent is hereby corrected as shown below:

Item [54]
 The title of the application should read --MOLD PROCESSING METHOD AND APPARATUS USING V-CAD DATA.--

Signed and Sealed this

Twentieth Day of February, 2007

JON W. DUDAS
*Director of the United States Patent and Trademark Office*